Feb. 9, 1960   R. R. REID, SR   2,924,258
MEAT CHOPPERS
Filed April 10, 1959
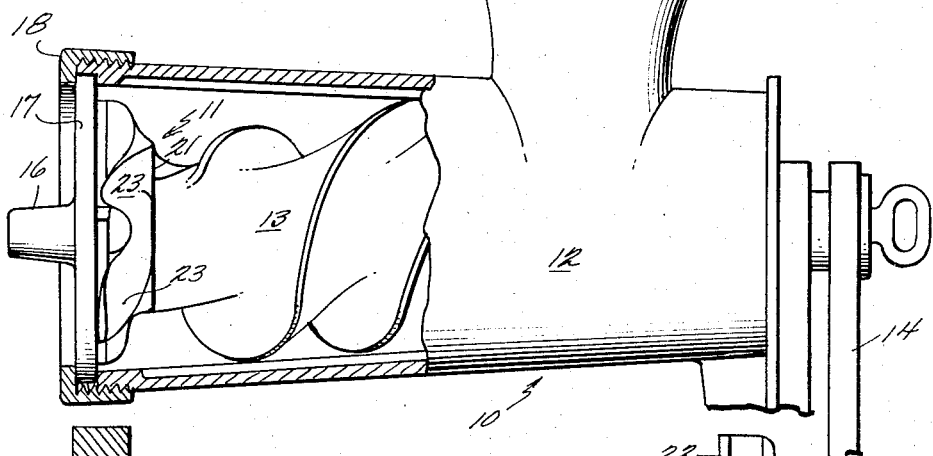
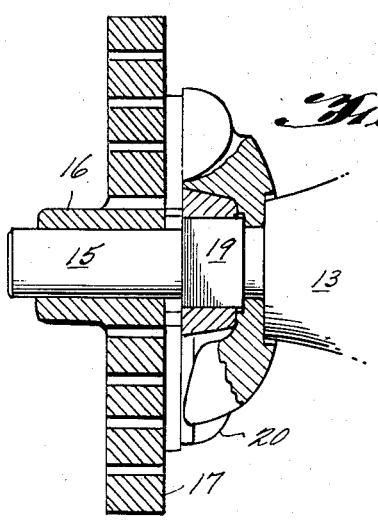
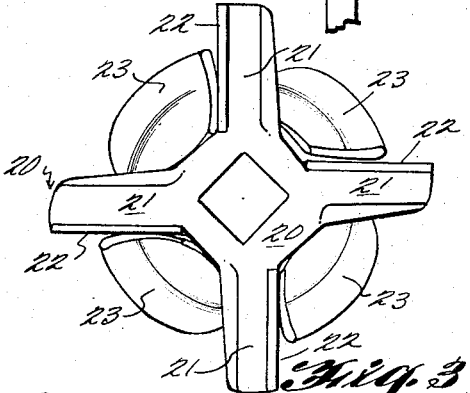
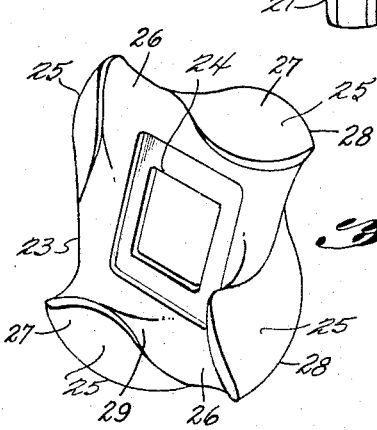
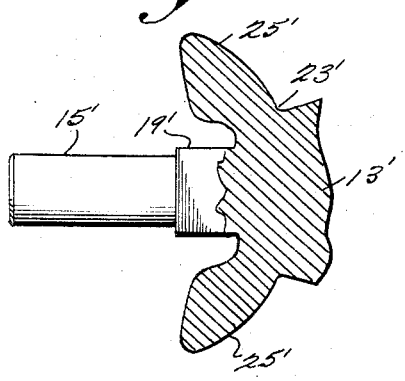
INVENTOR
REMER R. REID, SR.
BY
Adams & Bush
ATTORNEY

2,924,258
MEAT CHOPPERS

Remer Raimond Reid, Sr., Atlanta, Ga., assignor of one-half to Eugene A. Anderson Application April 10, 1959, Serial No. 805,566

3 Claims. (Cl. 146—189)

This invention relates to food choppers and has more particular reference to food choppers employed for chopping or grinding meat.

One object of the present invention is to provide a novel and improved food chopper for chopping or grinding meat having a device mounted therein in association with the knife for preventing sinews and gristle from forming a ball back of the knife and thereby expediting the grinding of the meat.

Another object of the present invention is to provide a meat chopper, as characterized above, wherein the device is in the form of a ring-shaped member having circumferentially spaced laterally extending wings projecting between the blades of the knife adjacent their bases and projecting outwardly and terminating adjacent the cutting edges of the blades of the knife, whereby the meat will flow smoothly between the blades of the knife and be forced up to the cutting edges of the blades, thus speeding the cutting of the meat.

Another object of the present invention is to provide a device for use with meat choppers for preventing sinews and gristle from forming a ball back of the knife and which may be readily mounted on existing meat grinding choppers and, when so assembled, may be readily disassembled for purposes of cleaning the apparatus.

A further object of the present invention is to provide a device which may be made as an integral part of a meat chopper or as an attachment for use therewith for preventing sinews and gristle from forming a ball back of the knife, and which is simple and economical in construction and efficient in carrying out its intended function.

Other objects and advantages of the invention will appear in the following specification when considered in connection with the accompanying drawings, wherein:

Fig. 1 is a fragmentary side elevation of a meat chopper, with parts shown in section, and having an attachment constructed in accordance with the present invention mounted therein for preventing sinews and gristle from forming a ball at the back of the knife;

Fig. 2 is an enlarged fragmentary vertical sectional view of the meat chopper shown in Fig. 1, showing the plate, the knife, and the attachment for preventing the formation of meat balls back of the knife;

Fig. 3 is an end view of the knife with the attachment mounted thereon;

Fig. 4 is a perspective view of the attachment; and

Fig. 5 is a fragmentary detail section showing how the attachment may be formed integral with the end of the worm.

The present invention is an improvement over that shown and described in my co-pending application Ser. No. 793,587, filed February 16, 1959, for Meat Chopper, and provides a food chopper for chopping and grinding meat having an attachment mounted therein in association with the knife and worm for forcing the meat up to the cutting edges of the knife and for preventing sinews and gristle from forming a ball back of the knife.

In general, the device comprises a ring-shaped member having circumferentially spaced laterally extending wings formed around its periphery with the wings extending between the blades of the knife and projecting laterally to positions adjacent the cutting edges of the blades.

The invention contemplates that the attachment may be a separate member mounted on the stud of the worm back of the knife, or it may be formed integral with the worm.

Referring now to the drawing, there is illustrated, in Fig. 1, a food chopper, indicated generally at 10, and having an attachment, indicated generally at 11, mounted therein and constructed in accordance with the present invention for preventing sinews and gristle from forming a ball back of the knife and for forcing the meat to the cutting edges of the blades.

The food chopper 10 may be of any suitable commercial construction and, as shown, comprises a barrel 12 having a worm 13 mounted therein provided with a handle 14 and having its stud 15 journaled in a bearing 16 formed in the perforated end plate 17, and a cap member 18 threadedly mounted on the end of the barrel for holding the plate 17 in position. The stud 15 is shown as provided with a square section 19 adjacent the end of the worm, on which is mounted the usual type of knife 20 having blades 21 provided with cutting edges 22.

The ring-shaped device or attachment 11 for preventing the sinews and gristle from forming a ball back of the knife and for forcing the meat up to the cutting edges of the knife blades is mounted on the stud of the worm back of the knife and is shown as comprising a disk-shaped member 23 provided with a central opening 24 and having a plurality of laterally extending circumferentially spaced wings 25 formed around its periphery with each wing projecting forwardly and laterally in a spiral manner to extend between a pair of blades of the knife when mounted on the hub of the knife rearwardly of the blades with the terminal edge of each wing positioned adjacent the cutting edge of a blade. The peripheral surfaces forming recesses 26 between the wing members 25 are curved so as to closely fit the back portions of the knife blades. The upper outer surfaces 27 of the wings curve upwardly and outwardly in a spiral manner toward the forward side of the knife. The spiral outer edges 28 of the upper surfaces of the wings are made sharp to cut the chunks of meat which are forced to the cutting edges of the knife blades. The under outer surfaces 29 of the wings are curved to closely fit the spaces between the blades at their bases. The ends of the wings are about one-half of the length of the knife blades (see Fig. 3) and terminate in a plane which is rearward of the plane in which the cutting edges of the knife blades lie. In this particular embodiment of the invention the back of the disk-shaped member 23 is shown as having a recess formed therein to receive the shoulder formed on the outer end of the Hobart type worm 13. The disk-shaped member 23 with its wings 25, in effect, form a shallow cup-like member in which is received the knife 20. The construction is such that the ring-shaped device 11 will snugly fit on the back of the knife with the wings projecting forwardly and laterally between the blades thereof. The curvature of the wings facilitates the meat being forced toward the cutting edges of the blades, and, together with the remaining body of the ring, prevents the formation of balls back of the knife by the meat. This construction also facilitates the grinding of the meat, makes the operation of the chopper more efficient, and speeds up the grinding operation.

While this particular embodiment of the invention has been described as used with a knife having a square back and a worm of the Hobart type having a shoulder on its outer end, obviously, the device is adapted for use with knives having round backs or for use on worms having a smooth end, and for use with any size knife. And while the outer free ends of the wings have been described as terminating adjacent to the cutting edges of the blades, obviously, they can be designed to terminate at any predetermined distance from the cutting edges of the blades.

While in the modification described, the ring-shaped member 11 has been shown as a separate member, it is contemplated that it may be made integral with the worm, as illustrated in Fig. 5. As shown in Fig. 5, the disk-shaped member 23' is formed integral with the end of the worm 13' and its wings 25' are identical in construction with the modification shown in Figs. 1 to 4, inclusive, and operate in the same manner.

Obviously, if the stud 15' with its square section 19', is of the type which is threaded into the end of the worm rather than being formed integral with the worm, then the disk-shaped member 23' could be formed integral with the stud rather than with the worm.

The operation of the apparatus is believed obvious. When the ring-shaped member 11 is used as a separate member it is mounted on the stud of the worm back of the knife, as shown in Fig. 1, and rotates with the knife and can be assembled and disassembled with the rest of the apparatus for purposes of cleaning. When the ring-shaped member is formed as an integral part of the stud or worm it, of course, may be removed with the stud or worm for purposes of cleaning.

From the foregoing, it readily will be seen that there has been provided a novel device for use with a meat chopper for preventing sinews and gristle from forming a ball back of the knife and forcing the meat up to the cutting edges of the knife blades and may be a separate member adapted to be assembled on the worm stud with the knife, or may be made as an integral part of the worm or stud.

Obviously, the invention is not restricted to the particular embodiment thereof herein shown and described.

What is claimed is:

1. A food chopper for grinding meat comprising a barrel, a perforated plate in the barrel, a worm rotatably mounted in the barrel, a knife operated by said worm, and means including a ring-shaped member mounted between the end of the worm and the knife and provided with a plurality of laterally projecting circumferentially spaced wings each projecting forwardly and laterally between an adjacent pair of knife blades with the ends of the wings terminating a predetermined distance from the cutting edges of the blades of the knife for preventing the sinews and gristle in the meat from forming a ball at the back of the knife and forcing the meat up to the cutting edges of the blades of the knife, the peripheral surfaces of said ring-shaped member between said wings are curved so as to closely fit the back of the knife blades, the upper outer surfaces of said wings curve upwardly and outwardly in a spiral manner toward the forward side of the knife with the outer spiral edges made sharp and the under outer surfaces of the wings are curved to closely fit the knife between the blades at their bases.

2. Apparatus as set forth in claim 1, wherein said ring-shaped member is integral with said worm.

3. An attachment for use with a meat chopper for preventing the sinews and gristle of the meat from forming a ball back of the knife comprising a ring-shaped member provided with a central opening and having a plurality of laterally extending circumferentially spaced wings formed around its periphery, said member being adapted to be mounted on the stud of the worm of a chopper between the end of the worm and the knife mounted thereon with each of said wings projecting upwardly and outwardly between an adjacent pair of blades of the knife, the peripheral surfaces of said ring-shaped member between said wings are curved so as to closely fit the back of the knife blades, the upper outer surfaces of said wings curve upwardly and outwardly in a spiral manner toward the forward side of the knife with the outer spiral edges made sharp and the under outer surfaces of the wings are curved to closely fit the knife between the blades at their bases.

References Cited in the file of this patent

UNITED STATES PATENTS 1,607,214    Smith                 Nov. 16, 1926